United States Patent [19]
Heikkinen et al.

[11] Patent Number: 5,825,758
[45] Date of Patent: Oct. 20, 1998

[54] METHOD AND APPARATUS FOR IMPROVING THE DETECTABILITY OF A BROADCAST CONTROL CHANNEL IN A MOBILE COMMUNICATION SYSTEM

[75] Inventors: Eero Heikkinen; Risto Uola, both of Oulu, Finland

[73] Assignee: Nokia Telecommunications Oy, Espoo, Finland

[21] Appl. No.: 591,499

[22] PCT Filed: May 24, 1995

[86] PCT No.: PCT/FI95/00285

§ 371 Date: Jan. 25, 1996

§ 102(e) Date: Jan. 25, 1996

[87] PCT Pub. No.: WO95/33313

PCT Pub. Date: Dec. 7, 1995

[30] Foreign Application Priority Data

May 26, 1994 [FI] Finland .................................... 942462

[51] Int. Cl.⁶ ................................ H04J 4/00; H04B 7/26
[52] U.S. Cl. ........................ 370/330; 370/436; 370/524; 455/63; 455/522
[58] Field of Search .................................... 370/321, 318, 370/330, 436, 478, 507, 522, 347, 336, 350, 335, 311, 319, 524; 455/67.1, 63, 69, 127, 435, 442, 115, 561, 511, 515, 450, 522, 501

[56] References Cited

U.S. PATENT DOCUMENTS 5,487,185 1/1996 Halonen ................................ 455/67.1
5,570,352 10/1996 Pöyhönen ................................ 370/330

FOREIGN PATENT DOCUMENTS 0 414 352 2/1991 European Pat. Off. .
0 462 601 12/1991 European Pat. Off. .
92/16059 9/1992 WIPO .

*Primary Examiner*—Huy D. Vu
*Attorney, Agent, or Firm*—IP Group of Pillsbury Madison & Sutro LLP

[57] ABSTRACT

A method for improving the delectability of a broadcast control channel of base in a radio system in which the transmitting and receiving frequency resources of respective transceiver units have been divided on the TDMA/FDMA principle into channels. The base stations have equipment for establishing radio connections to radio units in their respective radio coverage areas, and respective transmitters for transmitting a broadcast control channel. At least two of the base stations are arranged to transmit the broadcast control channel by utilizing the same predetermined frequency channel. In order to reduce interference, the transmission power used when transmitting on the predetermined frequency channel by the transmitters of the respective base stations is adjusted so as to be lower in those time slots in which the broadcast control channel is not transmitted, than it is in that or those time slots in which the broadcast control channel is transmitted.

7 Claims, 1 Drawing Sheet

METHOD AND APPARATUS FOR IMPROVING THE DETECTABILITY OF A BROADCAST CONTROL CHANNEL IN A MOBILE COMMUNICATION SYSTEM

This application claims benefit of international application PCT/FI95/00285 filed May 24, 1995 published as WO95/33313 Dec. 7, 1995.

FIELD OF THE INVENTION

This invention relates to a method for improving the detectability of a broadcast control channel of a base station in a radio system in which the transmitting and receiving frequency resources of the transceiver units a plurality of have been divided on the TDMA/FDMA principle into channels, the base stations comprising means for establishing a radio connection to radio units in their radio coverage area, and means for transmitting a broadcast control channel, whereby the system includes at least two base stations that have been arranged to transmit the broadcast control channel by utilizing the same predetermined frequency channel. The invention further relates to a cellular radio system comprising base stations, the transceiver units of which have their transmitting and resources divided on the TDMA/FDMA principle into channels, the base stations comprising means for establishing a radio connection to radio units in their radio coverage area, and means for transmitting a broadcast control channel, whereby the system includes at least two base stations that have been arranged to transmit the broadcast control channel by utilizing the same predetermined frequency channel.

BACKGROUND OF THE INVENTION

The invention is related to mobile communication systems divided into traffic channels on the TDMA/FDMA principle (Time Division Multiple Access/Frequency Division Multiple Access), and especially to the GSM (Groupe Special Mobile) system and DCS (Digital Cellular System). The invention is particularly related to a problem that arises when the same frequency channels have to be used in several radio cells situated near each other so that signals of different radio cells will intermingle and disturb one another.

The BCCH channel (Broadcast Control Channel) of the GSM and DCS systems is one example of a channel that is transmitted on the same frequency channel by a base station of several radio cells situated near each other. Base stations also use the frequency channel now being discussed for other purposes, for example, as a normal traffic channel, since the BCCH channel needs only one available time slot. The base station transmits information on the broadcast control channel concerning the respective radio cell, such as information on the frequencies of traffic channels to be used, for example.

In addition to the broadcast control channel of its own radio cell, a radio unit in a certain radio cell also listens to the broadcast control channel of the surrounding cells, decodes the received radio signals and performs measurements concerning the power levels of the received signals, that is, RSSI measurements (Received Signal Strength Indication). For instance, handovers, i.e. transitions from one radio cell to another are performed on the basis of such measurements. In the GSM/DCS system, base stations transmit information only in the first time slot of the BCCH broadcast control channel, i.e. in time slot $0$, whereby transceivers decode signals received only in that time slot. Other time slots are either used as traffic channels or fill frames are transmitted in them. Bursts transmitted in each time slot of the BCCH channel, i.e. even fill frames, are taken into account in the RSSI measurements of the transceiver.

SUMMARY OF THE INVENTION

Since the base stations of radio cells situated near each other transmit the BCCH channel by utilizing the same frequency channel, interference occurs between signals transmitted by different base stations, which will particularly disturb the radio units situated farther away. In practice, it has been shown that because of the interference, radio units situated farther have had problems with decoding faultlessly signals on the BCCH channel transmitted in time slot $0$.

The object of the present invention is to solve the above-mentioned problem. This object is achieved with the method of the invention that is characterized in that the transmission power of a predetermined frequency channel of the base station is adjusted lower in those time slots in which the broadcast control channel is not transmitted than it is in that or those time slots in which the broadcast control channel is transmitted.

The invention also relates to a cellular radio system in which the method of the invention can be utilized. The system of the invention is characterized in that at least one of the base stations comprises control means for adjusting the transmission power of the aforesaid predetermined frequency channel so as to be lower in that or those time slots in which that predetermined frequency channel does not transmit the broadcast control channel.

The invention is based on the idea that the mutual disturbance between base stations situated near each other is significantly lowered if the transmission power of that frequency channel which the base stations utilize for transmitting the BCCH channel is lowered so that only the time slots used for transmitting the BCCH channel are transmitted with full power, and the other time slots of the same frequency channel are transmitted with a lower transmission power. As the base stations of the system transmit only the essential time slots with full power and all the other signals transmitted on the same frequency channel on a lower power level, disturbances and interference on that channel are significantly reduced on that channel, whereby even transceivers situated farther away are able to decode faultlessly the information transmitted on the BCCH channel. The arrangement of the invention is especially advantageous in such networks in which the time slots of a broadcast control channel are transmitted synchronized so that the cells situated near each other, using the same broadcast control channel, transmit the time slots of the broadcast control channel at different times.

If calls are also transmitted on the frequency channel of the broadcast control channel, the quality of the calls may decrease slightly due to a lower power level. This will not become a problem because in a situation of this kind the base station can perform a handover to such a traffic channel on which the frequency channel of the broadcast control channel is not used at all.

The RSSI measurements of the transceiver units situated in the neighbouring cells naturally suffer somewhat from the fact that different time slots of the broadcast control channel are transmitted with different power levels. This will not become a problem in most cases, as the possible handovers and the corresponding procedures based on the RSSI measurement are generally performed on the basis of the average of the RSSI measurements which naturally changes very little in a case in which just one or a few time slots have been transmitted on a higher power level. Furthermore, the variations in the transmission power of the BCCH channel can be taken into account in handover algorithms. Possible unnecessary handovers, which may mainly occur when a transceiver unit is switched on after it has been switched off (whereupon it has to select the most suitable radio cell), will not have any serious consequences as they will be corrected after a while by a new handover between the cells which will not cause any extra loading in the network.

Hence, the most significant advantages of the method and the system of the invention are that the mutual disturbance of base stations diminishes, whereby radio units will be more reliable in decoding information transmitted on the broadcast control channel, and that a transceiver corresponding to the other transceivers (the same transmission power) of the base station can be used for transmitting the broadcast control channel, the lifetime of the transceiver will become longer and the consumption of energy lower due to use of a transmission power which is lower than the maximum power. When the transmission power of the broadcast control channel is lowered, instead of it being raised, for example, in order to accomplish a corresponding situation, it is not necessary to use a more powerful and more expensive transceiver than other transceivers for transmitting the broadcast control channel.

BRIEF DESCRIPTION OF THE DRAWINGS

In the following, the invention will be described in more detail by way of example by means of a first preferred embodiment of the system according to the invention with reference to the accompanying figures, in which.

DETAILED DESCRIPTION OF A PREFERRED EMBODIMENT OF THE INVENTION

Figure 1:
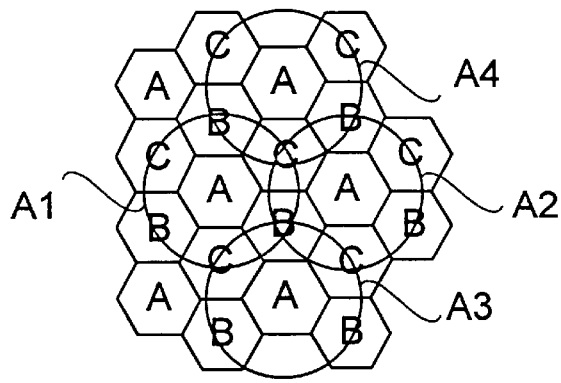
FIG. 1 illustrates the structure of a cellular radio system.

FIG. 1 shows a diagram of a part of the GSM cellular radio system. The GSM system is described in more detail for example in The GSM System for Mobile Communications, by M. Moyle and M-B. Pautet, Palaiseau, France, 1992, ISBN:2-9507190-0-7, for which reason it will not be described in greater detail in this context.

FIG. 1 illustrates the re-use of frequency channels in the GSM system. In the case of FIG. 1, the frequency channels in use are divided so that the same frequency channels are used in each radio cell indicated by the same letter (A, B or C). That is, the same frequency channels are used in all the cells indicated by the letter A. Therefore, the same frequency channel is also used for transmitting a BCCH channel in the radio cells being discussed.

Circles A1, A2, A3 and A4 in FIG. 1 illustrate the area to which the disturbance of the cells indicated by the letter A will extend when the maximum transmission power is used in them. Therefore, the radio unit situated in the radio cell B, inside the circles A1, A2 and A3, has problems in known systems in connection with the reception and decoding of broadcast control channels of the neighbouring cells indicated by the letter A.

Figure 2:
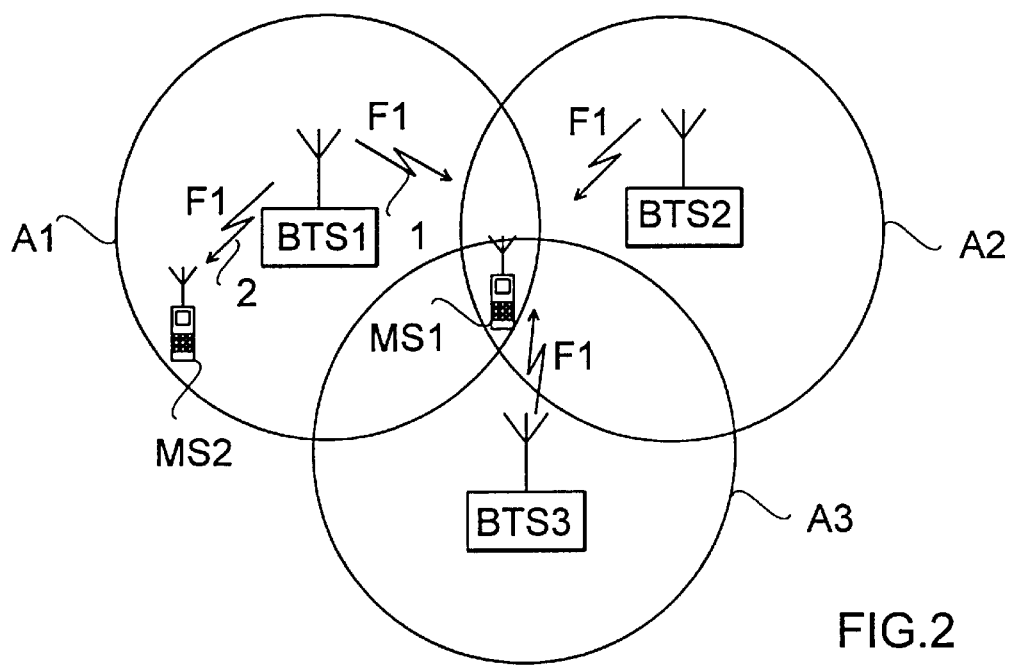
FIG. 2 is a detailed view of a part of the cellular radio system shown in FIG. 1.

FIG. 2 is a detailed view of a part of the cellular radio system shown in FIG. 1. FIG. 2 shows only three base stations BTS1 to BTS3 of a radio cell indicated by the letter A in FIG. 1, and areas A1, A2 and A3 to which their disturbance will extend when the base stations transmit with the maximum power.

FIG. 2 shows that all the base stations BTS1, BTS2 and BTS3 make use of the same frequency channel F1 for transmitting the broadcast control channel, BCCH. A radio unit MS1 shown in FIG. 2 (situated in the radio cell B shown in FIG. 1) receives the BCCH channel transmitted by all the base stations in FIG. 2. In a situation shown in FIG. 2, in addition to the BCCN channel, the base station BTS1 transmits a call to a radio unit MS2 situated in the radio coverage area of the base station BTS1.

According to the invention, the transmission power of the broadcast control frequency channel F1 of the base stations BTS1 to BTS3 shown in FIG. 2 is adjusted so that only the time slots of the broadcast control channel are transmitted with the maximum power. The other time slots of the BCCH frequency channel F1 are transmitted on a 1 to 5 dB lower level.

Figure 3:
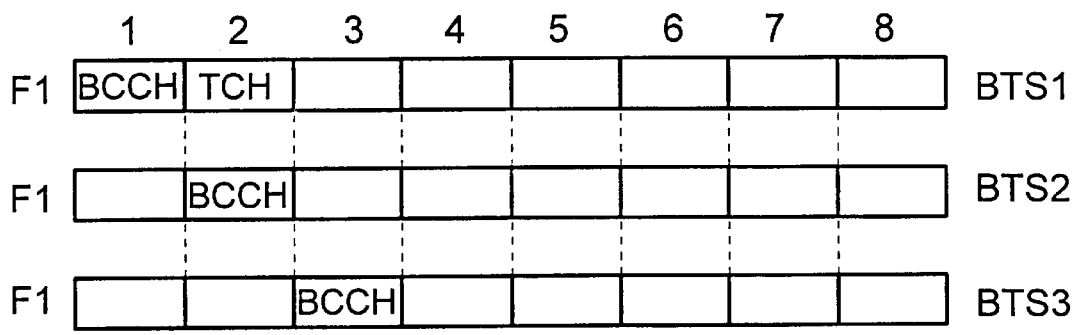
FIG. 3 illustrates the mutual synchronization of signals transmitted by the base stations of FIG. 2.

FIG. 3 illustrates the mutual synchronization of signals transmitted by the base stations BTS1, BTS2 and BTS3 of FIG. 2. FIG. 3 shows that the base stations are mutually synchronized so that they transmit the broadcast control channel, i.e. the BCCH channel at different times. Therefore, the base station BTS1 transmits the BCCH channel on frequency F1 and in time slot 1. In accordance with the invention, that time slot is transmitted with the maximum power, that is, in practice with the same transmission power as is used on the other frequency channels of the base station. In time slot 2 the base station BTS1 transmits a call to the radio unit MS2 shown in FIG. 2. In accordance with the invention, the base station BTS1 transmits time slot 2 (and time slots 3 to 6 if there is traffic in them) of frequency channel F1 on a lower power level than time slot 1. In the case of FIG. 2, time slots 3 to 8 are free, that is, the base station BTS1 does not transmit anything during them.

FIG. 3 further shows that the base station BTS2 transmits the BCCH channel in time slot 2 and that the base station BTS3 transmits the BCCH channel in time slot 3. The other time slots of frequency channel F1 of the base stations BTS2 and BTS3 are free but when they are taken into use, the base stations BTS2 and BTS3 comprise a control means which adjusts the transmission power in time slots 1 and 3 to 8 of the base station BTS2 and in time slots 1 to 2 and 4 to 8 of the base station BTS3 lower than in the time slot in which these base stations transmit the BCCH channel. Therefore, the base stations BTS1 to BTS3 transmit only the BCCH time slot with full transmission power. The radio unit MS1 is thus capable of receiving and decoding the BCCH channel transmitted by the base station BTS2 in time slot 2 faultlessly even though the base station BTS1 is at the same time transmitting a call to the radio unit MS2 on the same frequency channel F1. This is possible because the base station BTS2 transmits, according to the invention, the BCCH channel with the maximum transmission power, and the base station BTS1 transmits, according to the invention, in time slot 2 with a lowered transmission power. The base stations of FIG. 2 are thus mutually synchronized so that each of them transmits the BCCH channel in its own turn and with full power. The base stations BTS1 to BTS3 do not even momentarily transmit simultaneously with the maximum power on frequency channel F1. The adjustment of the transmission power can be accomplished in the base stations BTS1 to BTS3 by utilizing a dynamic power adjustment known per se, whereby a base station controller, for example, can act as a control unit controlling the transmission power of the base stations.

It is to be understood that the specification above and the figures related thereto are only meant to illustrate the present invention. The different variations and modifications of the invention will be apparent for those skilled in the art without deviating from the scope and spirit of the invention presented in the appended claims.

We claim:

1. A method for improving the detectability of a broadcast control channel of each of a plurality of a base stations in a radio system in which the transmitting and receiving frequency resources of respective transceiver units have been divided on the TDMA/FDMA principle into a plurality of channels, the base stations each comprising equipment for establishing a radio connection to radio units in respective radio coverage areas of the respective base stations, and a transmitter for transmitting a broadcast control channel, at least two of the base stations being arranged to transmit the broadcast control channel by utilizing a same pre-predetermined frequency channel comprising:

adjusting the transmission power used by each respective transmitter for transmitting on said predetermined frequency channel by each of said at least two base stations so as to be lower in those time slots in which the broadcast control channel is not transmitted by the transmitter of the respective base station than said transmission power is in that or those time slots in which the broadcast control channel is transmitted by the transmitter of the respective base station.

2. The method according to claim 1, wherein:

transmissions by respective ones of said at least two base stations in the time slots of said predetermined frequency channel in which the broadcast control channel is not transmitted, are transmitted at a level which is 1 to 5 dB lower than are respective transmissions in those time slots of said predetermined frequency channel in which the broadcast control channel is transmitted by the transmitter of the respective base station.

3. The method according to claim 1, wherein:

each said base station is a base station of Digital Communication System or Groupe Special Mobile mobile communication system.

4. The method according to claim 1, further comprising:

mutually synchronizing said at least two base stations so that they transmit the broadcast control channel at different times.

5. A cellular radio system, comprising:

a plurality of base stations, having respective transceiver units the transmitting and receiving frequency resources of which are divided on the TDMA/FDMA principle into a plurality of channels, each of said base stations comprising means for establishing a radio connection to radio units in a respective radio coverage area, and means for transmitting a broadcast control channel, said base stations including at least two base stations arranged to transmit the broadcast control channel by utilizing a same predetermined frequency channel, at least one of said base stations comprising control means for adjusting the transmission power of transmissions by the respective transmitter on said predetermined frequency channel so as to be lower in that or those time slots in which the respective transmitter does not transmit the broadcast control channel.

6. The cellular radio system according to claim 5, wherein:

said at least two base stations each include control means arranged to adjust the transmission power so that the time slots of said predetermined frequency channel in which the broadcast control channel is not transmitted, are transmitted on at a level which is 1 to 5 dB lower than are transmissions by the respective transmitter in those time slots of the frequency channel in which the broadcast control channel is transmitted.

7. The cellular radio system according to claim 5, wherein:

said system is Groupe Special Mobile or Digital Cellular System cellular radio system.

* * * * *